United States Patent [19]

Lovaas

[11] Patent Number: 4,770,461
[45] Date of Patent: Sep. 13, 1988

[54] VEHICLE BED COVER ASSEMBLY
[75] Inventor: Ann B. Lovaas, Crystal River, Fla.
[73] Assignee: ABL Unlimited, Inc., Homosassa, Fla.
[21] Appl. No.: 69,323
[22] Filed: Jul. 2, 1987

Related U.S. Application Data

[63] Continuation-in-part of Ser. No. 36,987, Apr. 10, 1987, abandoned, which is a continuation-in-part of Ser. No. 933,483, Nov. 21, 1986, Pat. No. 4,741,570.

[51] Int. Cl.$^4$ .............................................. B60P 7/02
[52] U.S. Cl. ................................................. 296/100
[58] Field of Search .................. 296/100, 216; 49/254, 49/234, 235

[56] References Cited

U.S. PATENT DOCUMENTS

| | | | |
|---|---|---|---|
| 2,853,340 | 9/1958 | Hershberger | 296/100 |
| 3,165,352 | 6/1965 | Hallock et al. | 296/100 |
| 3,342,523 | 9/1967 | Lutgen | 296/100 |
| 3,640,565 | 2/1972 | Anderson | 296/100 |
| 4,068,886 | 1/1978 | Gastomski | 296/100 |

Primary Examiner—Robert R. Song
Attorney, Agent, or Firm—Pettis & McDonald

[57] ABSTRACT

A cover assembly for a vehicle bed includes a plurality of rigid, telescoping cover members longitudinally movable on guide track members mounted along the side of the vehicle bed with latching apparatus for releasably securing the respective cover members extending over the front end and the rear end of the vehicle bed to permit opening of the cover to expose either the front portion or the rear portion of the vehicle bed, or both such portions. A first cover member releasably fixable in a position covering the front end of the vehicle bed is receivable under an adjacent cover member and a second cover member releasably fixable in a position covering the rear end of the vehicle bed is receivable over an adjacent cover member.

24 Claims, 5 Drawing Sheets

VEHICLE BED COVER ASSEMBLY

RELATED APPLICATIONS

This application is a continuation-in-part of application Ser. No. 036,987, filed Apr. 10, 1987, abandoned, which application is a continuation-in-part of application Ser. No. 933,483, filed Nov. 21, 1986 now U.S. Pat. No. 4,741,570.

BACKGROUND OF THE INVENTION

This invention relates to the field of cover assemblies for vehicles having open beds, such as pickup trucks or similar vehicles. More particularly, the invention relates to the field of substantially rigid covers for such vehicles, which covers are formed of a plurality of relatively movable segments. Still more particularly, this invention relates to such covers that include means for releasably latching portions thereof in any of a plurality of predetermined positions, covering or exposing portions of the vehicle bed.

Various types of vehicle bed cover assemblies have been known in the past. These have included flexible covers affixed by snaps or other fasteners around the uppermost extremities of the sides of the vehicle bed, rigid covers hingedly attached to the vehicle bed and various types of sliding or telescoping covers. Exemplary of the rigid telescoping cover assemblies of the prior art is U.S. Pat. No. 3,640,565 to Anderson. In this prior art patent a forward segment of the cover assembly is rigidly affixed to the forward portion of the vehicle bed and a rear section is slidably movable between an extended position covering the vehicle bed and a retracted position beneath the fixed segment. While such a prior art device provides several improvements over the soft type of covers or the hinged covers, it has provided substantial inconvenience in blocking access to the forward portion of the vehicle bed. Moreover, conventional telescoping covers having close fits between adjacent cover members can jam and be difficult to open. Other such covers have unduly large gaps between the adjoining members which can admit dirt and debris and cause the cover members to rattle.

SUMMARY OF THE INVENTION

To overcome various of the disadvantages of the prior art cover assemblies noted above, it is an object of the present invention to provide such a cover assembly that may be slidably openable from either the front end or the rear end of the vehicle bed. It is another object of this invention to provide such a cover assembly in which at least certain of the segments are positionable in any of a plurality of positions, selectively uncovering the front or rear portions of the vehicle bed, or both such front and rear portions. It is still another object to provide a telescoping cover that features a close tolerance between adjoining cover members to preclude dirt while at the same time being easily slidable into open and closed conditions. To achieve these and other objects that will become apparent to those skilled in the art, the present invention provides a telescoping cover assembly formed of a plurality of substantially rigid cover members, a pair of guide track members for guiding the longitudinal movement of the cover members and releasable latching means affixed to the respective cover members extending over the front and rear ends of the vehicle bed. Each of the cover members extends transversely beyond the longitudinal edges of the vehicle bed, and each longitudinally overlaps and is longitudinally movable relative to another, with a first such cover member being releasably fixable in a position covering the front end of the vehicle bed and a second cover member being positionable in any of a plurality of preselected positions completely covering or exposing preselected portions of the rear of the vehicle bed. The first cover member is telescopically receiveable under an adjacent cover member and the second cover member is telescopically receiveable over an adjacent cover member. One each of the guide track members is affixed to the vehicle adjacent and longitudinally parallel to each lateral side of the vehicle bed for guiding the longitudinal movement of the cover members. Affixed to each such cover member are at least two support slide assemblies with one each of the support slide assemblies engaging each such guide track member to provide sliding support for the longitudinal movement of the cover member.

DESCRIPTION OF THE DRAWINGS

Particularly preferred embodiments of the apparatus of this invention will be described in detail below in conjunction with the drawings in which.

DETAILED DESCRIPTION OF PREFERRED EMBODIMENTS

Figure 1:
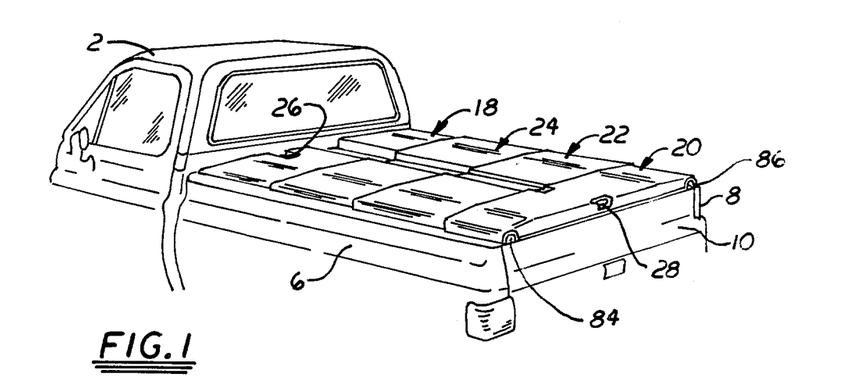
FIG. 1 is a perspective view of one preferred embodiment of the vehicle bed cover assembly of this invention installed on a pickup truck type vehicle, with the cover members shown in their extended, bed covering closed positions.
Figure 2:
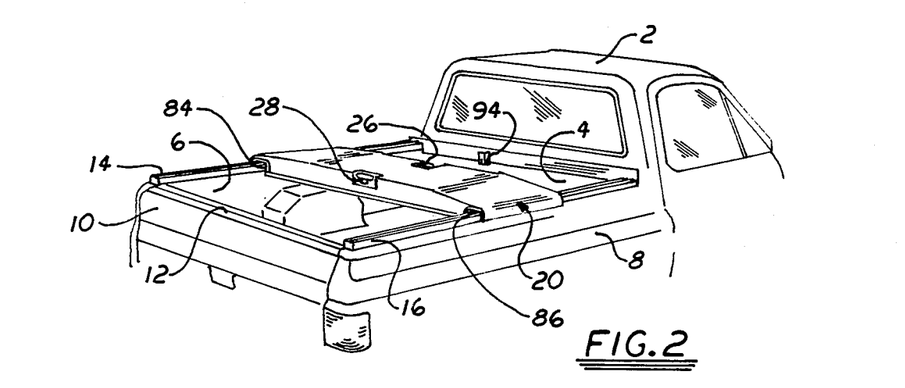
FIG. 2 is a perspective view of the cover assembly of FIG. 1 in which the individual cover members are telescopically collapsed to uncover selected portions of the vehicle bed.

The principal components of one preferred embodiment of the telescoping vehicle bed cover assembly of this invention are illustrated in the perspective views of FIGS. 1 and 2. FIG. 1 illustrates the telescoping vehicle bed cover assembly of the invention as installed on a typical vehicle 2, such as a pickup truck. This pickup truck 2 includes an open bed having a front side 4, two generally parallel lateral sides 6 and 8 and a hinged rear gate 10. This rear gate 10 extends between the lateral sides 6 and 8 and includes an upper edge 12 and, spaced therefrom, a lower edge (not shown) hingedly attached to the vehicle.

As shown most clearly in FIG. 2, the telescoping cover assembly of this apparatus includes a pair of guide track members 14 and 16, described in greater detail below, each affixed to the vehicle adjacent and longitudinally parallel to the respective lateral sides 6 and 8 of the vehicle bed. These guide track members 14 and 16 provide for guiding longitudinal movement of the individual cover members. The cover members include a first cover member 18, shown in FIG. 1 covering the front portion of the vehicle bed, a second cover member 20 shown in FIG. 1 covering the rear portion of the vehicle and intermediate cover members 22 and 24. While the illustrated embodiment includes a total of four such cover members, it is to be understood that the apparatus of this invention may include any number of such cover members greater than one, depending largely upon the length of the vehicle bed to be covered. Practical considerations of fabrication techniques and material strength will largely determine the number of such cover members to be utilized for a given length of bed. These cover members 18 through 24 may be formed of any suitable, substantially rigid material, such as metal or synthetic resins. Conveniently, the cover members may be formed by injection molding or by vacuum forming of a synthetic resin such as ABS (acrylonitrile-butadiene-styrene) or polypropylene, or by layup of glass fiber matting and corresponding appropriate resins.

As shown in FIGS. 1 and 2, each adjacent pair 20 and 22, 22 and 24, and 18 and 24 of such cover members is configured such that one such adjacent cover member is telescopically receivable over the other adjacent cover member. In particular, first cover member 18 is received under cover member 24; cover member 24 is received under cover member 22; and cover member 22 is received under second member 20. This permits the telescopic retraction or collapsing of the cover members shown in FIG. 2 to uncover most of the vehicle bed for access. As will be described in greater detail below, the first cover member 18 is provided with releasable latching means, of which the actuating handle 26 is shown on FIGS. 1 and 2. This first releasable latching means provides for releasably latching the first cover member 18 in the position shown in FIG. 1 covering the front portion of the vehicle bed and, upon release, provides for moving that first cover member 18 longitudinally to the rear to expose the front portion of the vehicle bed, as shown in FIG. 2. A second releasable latching means, of which the handle 28 is shown in FIGS. 1 and 2, is provided, affixed to the second cover member 20, for releasably latching that cover member in a position covering the rear of the vehicle bed.

FIGS. 3–7 illustrate on a larger scale and in greater detail the structural features of a preferred manner of constructing the cover assembly of this invention. The releasable latching arrangement for the second cover member 20 is shown in detail in FIGS. 5, and 6. This second latching assembly or means includes a locking handle, such as T-shaped handle 28, which is pivotably attached by means of a pin 25 to a shaft 27 that is rotatably mounted in the rear wall 29 of cover member 20. When not in use handle 28 is pivoted into recess 31. Attached to shaft 27 within second cover member 20 is latching finger 30, which is configured and positioned to engage the latch finger receiver 32 that preferably is affixed to the rear gate 10 of the vehicle. Interengagement between the latch finger 30, when rotated by handle 28 into the position 30a shown in phantom, and the receiver 32 thus prevents movement of the cover member 20 and latches that member in its position covering the rear of the vehicle bed.

Figure 3:
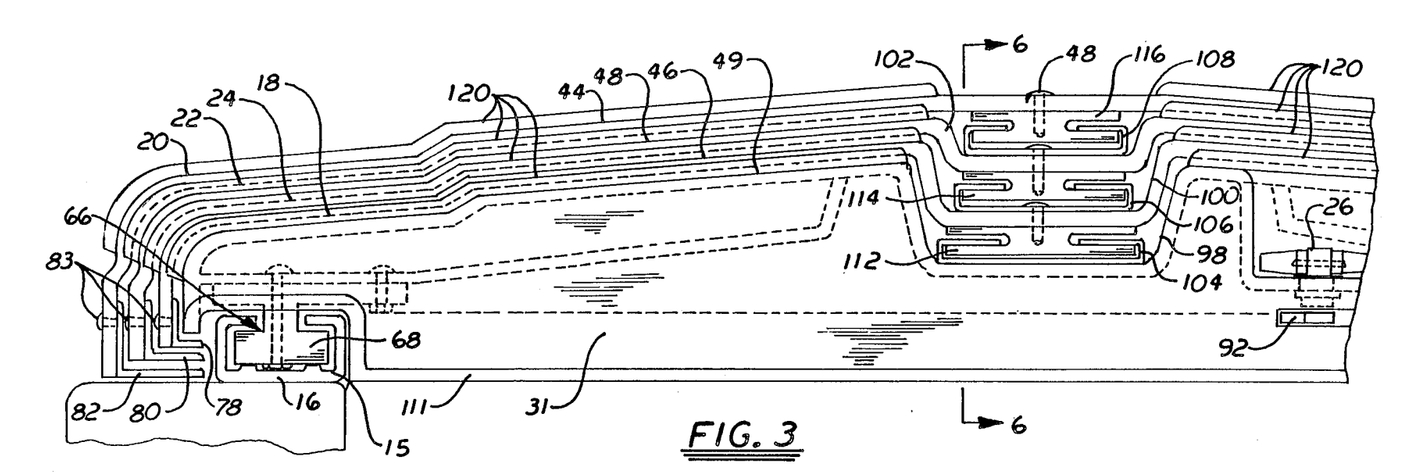
FIG. 3 is a fragmentary front elevational view of the cover assembly of FIG. 1.
Figure 4:
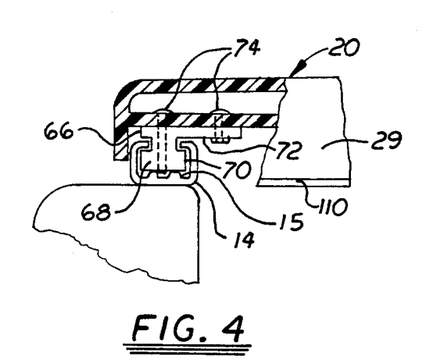
FIG. 4 is a fragmentary rear elevational view, partially in section of the cover assembly of FIG. 1.
Figure 5:
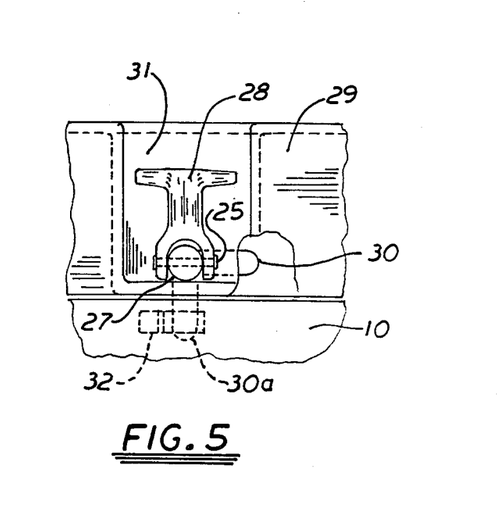
FIG. 5 is a fragmentary rear elevational view of the cover assembly of FIG. 1 illustrating operation of the rearward latching handle.
Figure 6:
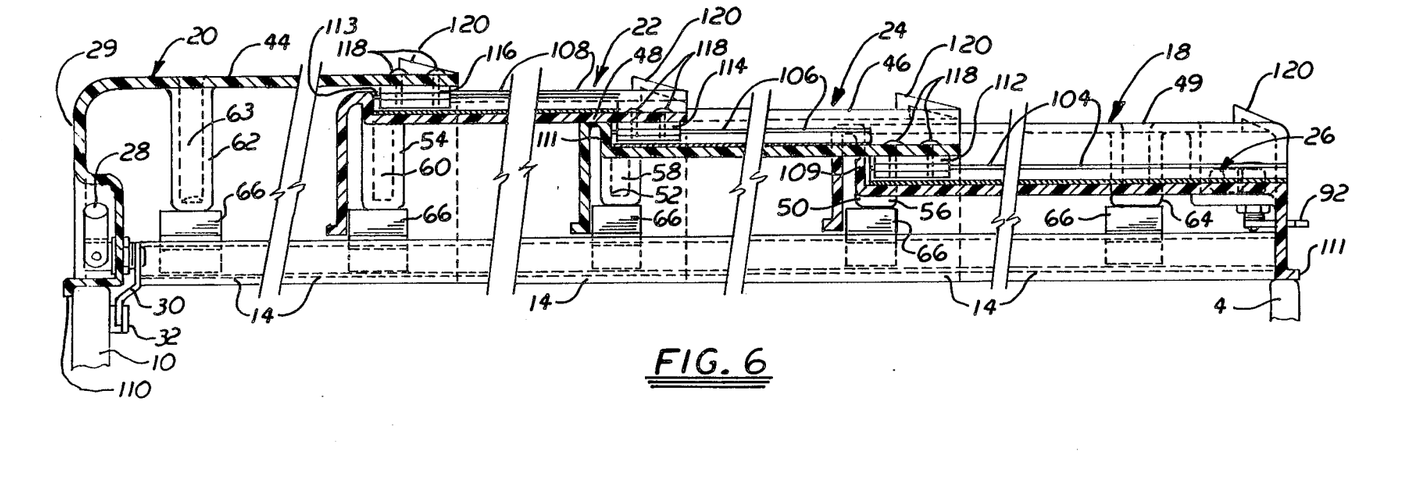
FIG. 6 is a side sectional view of the cover assembly of FIG. 3, taken along line 6—6.
Figure 7:
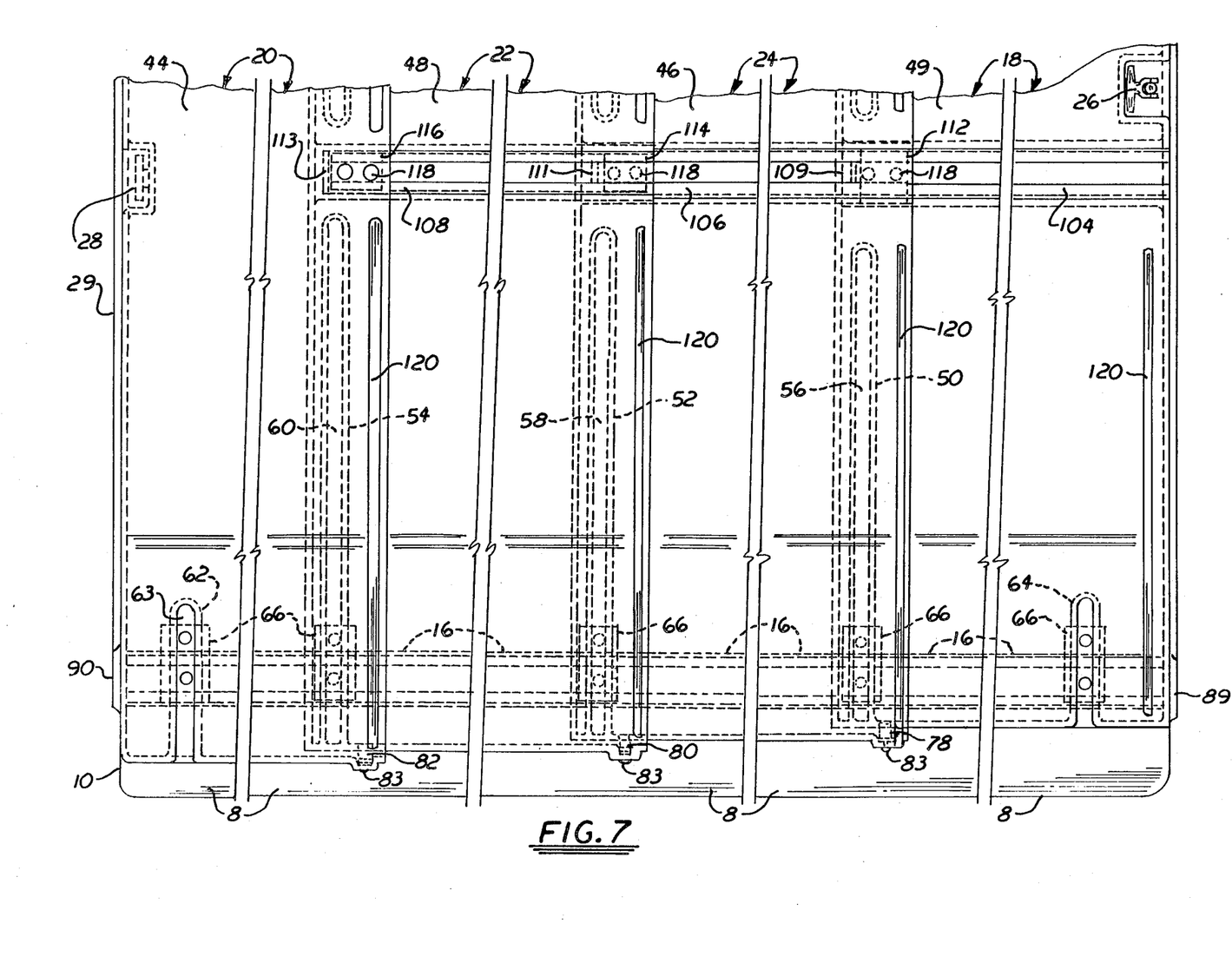
FIG. 7 is a fragmentary top plan view of one side of the cover assembly of FIG. 1;.

In FIGS. 3, 6 and 7 are illustrated portions of the right-hand side of this cover assembly. FIG. 4 illustrates a portion of the left-hand side of the cover assembly. It is to be understood that, in these preferred embodiments, the structures of the left and right hand sides of the apparatus are, in general mirror images of one another with respect to a vertical plane extending longitudinally through the center of the cover assembly.

The construction of the second cover member 20 and the other cover members of the first preferred embodiment of the assembly is shown in more detail in the sectional view of FIG. 6. Each of the cover members, such as cover member 20, is formed with at least one hipped portion such as portion 44 on member 20. Corresponding hipped portions 46, 48 and 49 extend longitudinally in the center of cover members 24, 22 and 18 respectively. These hipped portions provide additional strength to the cover members and also include intermediate track and guide structure, described below, to provide for interengagement between the cover members to control relative movement thereof.

On the cover members 22, 24 and 18 and extending transversely between the lateral sides of the cover members are strengthening ribs 53, 55 and 57 that respectively depend from the rearward end of each of the cover members. Adjacent the rearward end of cover members 22, 24 and 18 are reinforcing ribs 54, 52 and 50 respectively. These ribs 50, 52 and 54 are shown most clearly in FIGS. 6 and 7. Preferably, each of these reinforcing ribs is generally U-shaped in cross section so that the respective center portions or slots 56, 58 and 60 of the U may serve as drainage channels to carry out to the lateral edges of the cover member any water from rain or other sources that may run toward the front of each such cover member, thus preventing such water from entering the bed of the truck. Preferably each of the draining channels 56, 58 and 60 in the respective ribs 50, 52 and 54 extend all the way to the outermost edge of their respective cover members, so that the rain will be carried out beyond the guide track members 14 and 16 so that any water or other liquid entering those gutter slots will be directed outside the guide tracks 14 and 16 to run off the lateral sides 6 and 8 of the vehicle.

In addition to these trough-like rib members 50, 52 and 54 on cover members 18, 22 and 24, respectively, there also may be provided an additional transverse strengthening rib 64 adjacent the front of first cover member 18 and transverse strengthening rib 62 having a drainage channel 63 adjacent the rearward end of cover member 20. In addition to providing additional strength to the cover members, these transversely extending rib members also may provide the attachment points for support slide assemblies 66 that slidably support the cover members for the desired longitudinal movement. The support slide assemblies 66 are mounted to their respective cover members adjacent the lateral sides thereof and engage the respective guide track members 14 and 16, conveniently in the manner illustrated in FIGS. 3, 4, 6 and 7. In FIGS. 3 and 4 are illustrated one of the support slide assemblies that is typical of each of the slide assemblies shown. This slide assembly 66 includes support slide 68, suitably formed of a low-friction synthetic resin such a Nylon or Teflon, mounted by pins, bolts or other suitable fasteners 74 to the respective rib member, such as rib 64. Slide 68 is received within the guide track member 14 preferably in the manner illustrated in FIGS. 3 and 4. In this embodiment the guide track is in the form of a square or rectangular channel having a ribbed bottom and two full sides with partial top sides leaving open a slot along the top through which a portion of the slide 68 extends. Preferably, this slide 68 also includes an enlarged portion 70 that is wider in the transverse or lateral direction than the width of the slot in the top of track member 14. This provides means for interlocking the slide assembly with its respective guide track member to prevent lifting away from the track member of the cover member to which the slide assembly is attached, effectively capturing the slide assembly and the cover member.

By providing blunt ends on the slide 68, movement of that slide 68 longitudinally of the respected tracks 14 or 16 will urge any foreign matter in the track in front of the slide, thus effecting a cleaning action. Due to the provision of upwardly extending ribs 15 on the base of the guide track 14 (and correspondingly on guide track 16) the slide 68 is supported by engagement of its lower surface with the upper surface of those ribs 15. This spaces the slide 68 above the lowermost portion of the channel formed by a guide track 14 so that small debris such as sand may fall into the lower portions, and also provides for clearance of screws used to mount the guide track the vehicle bed.

As shown most clearly in the fragmentary sectional view of FIG. 4, each slide 68 preferably is formed with an enlarged portion 72 located above the guide track 14 to serve as an additional support for possible engagement between slide assembly 66 and guide track 14. A suitably close fit between the enlarged portion 70 and the upper portion 72 of the slide 68 and the thickness of the uppermost portion of the guide track 14 will also restrain the cover members against rattling.

To accommodate vehicle beds of differing widths means may be provided for locating at least one and preferably both support slide assemblies 66 on each cover member at any of a plurality of predetermined positions spaced transversely from the longitudinal center line of the cover assembly. These means may conveniently take the form of either premarked locations for holes through which the pin 74 may be inserted through rib member 64 or by predrilled holes. These markings or holes are provided at locations that will accommodate the various popular widths of vehicle beds.

FIG. 3 also illustrates one preferred configuration for the lateral sides of the cover members. This preferred embodiment illustrates a cover assembly formed preferably by vacuum forming. The transverse extremities or outermost edges of first cover member 18, shown in section curve downwardly and end below the upper level of the track member 16 (and 14 on the opposite side). Adjacent cover member 24 is configured and dimensioned to extend over and around the outer edge of first member 18. The transverse extremity of cover member 24 includes lip means 78 extending under the lowermost portion of the outer edge of cover member 18. Such lip means 78 may be formed either by molding, or, preferably as shown in FIG. 3, by affixing anelement such as a section of aluminum angle to the lowermost portion of cover member 24. Likewise, cover member 22 extends around and over cover member 24 and includes lip means 80 extending around and beneath the lower lip 78 of cover member 22. Second cover 20 extends around and over the outer extremities of cover member 22 and includes lip means 82 extending under the lip 80 of cover member 24. Preferably each of the lip means 78, 80 and 82 are formed in the manner set forth above and, where formed of aluminum angle, may be affixed to the respective cover members by conventional means such as rivets 83. These lips 78, 80 and 82 and this overlapping configuration help prevent entry of dirt and water into the space between the cover members and also provide additional interengagement between the edges of the respective adjacent cover members to further strengthen the cover members and restrict relative vertical movement between adjacent cover members.

As shown most clearly in FIGS. 1 and 2, second cover member 20 includes at its rear corners openings 84 and 86 that are dimensioned to fit around the respective guide track members 14 and 16 to permit longitudinal movement of that cover member 20 toward the front of the vehicle bed without interference with the track members. As shown on FIG. 7, around these apertures 84 and 86 are formed flared lips 88 (not shown) and 90 which serve to deflect any rainwater or other runoff outwardly away from the aperture and thus reduce the likelihood of rainwater entering the vehicle bed. Similar flared lips 89 and 91 (not shown) may be provided around corresponding apertures in the forward end of cover member 18 to provide for rearward sliding of that forward cover member 18.

FIGS. 3 and 6 illustrate most clearly the releasable latching arrangement for the first cover member 18. This latching handle 26, which may be substantially similar to lockable handle 28 on the second member 20, has affixed to it a latching finger 92 that rotates with rotation of the handle 26. This latching finger 92 is releasably receivable into engagement with a hook 94 affixed to the top of the front end 4 of the vehicle bed, as shown in FIG. 2. By engagement between the latching finger 92 and the hook 94 the first cover member 18 is prevented from any rearward movement. However, upon release of that latching engagement with hook 94, the first cover panel 18 may then be moved longitudinally of the vehicle bed toward the rear thereof to provide for access to the front portion of the vehicle bed, as shown in FIG. 2.

To provide for secure engagement between the adjacent cover members and to limit rearward movement of one adjacent cover member with respect to an adjacent such cover member, there are provided interengageable means on the cover members, as best shown in FIGS. 3 and 6. As noted above, each of the cover members 20, 22, 24 and 18 are provided with the hipped portions 44, 48, 46 and 49, respectively. Intermediate the opposing lateral sides of the cover members and preferably in the center of the hipped portions of cover members 18, 24 and 22 are formed troughs 98, 100 and 102, respectively. Affixed to the upward facing surfaces of the lowermost portions of each of these troughs 98, 100 and 102 are intermediate guide tracks 104, 106 and 108, respectively. Each of these guide tracks 104, 106 and 108 preferably is in the form of a rectangular channel having a bottom and two full sides with partial top sides leaving open a slot along the top, somewhat similar in configuration to the guide tracks 14 and 16. Affixed to the cover members 24, 22 and 20 are intermediate guide members 112, 114 and 116, respectively. Each of these guide members has the configuration generally of a horizontal letter H and preferably is formed of a low friction synthetic resin, such as Nylon or Teflon. In this configuration each of the guide members 112, 114 and 116 includes a lower enlarged portion and an upper enlarged portion, each substantially larger in transverse cross section than the width of the opening in the top of each of the guide tracks 104, 106 and 108. As shown in FIG. 3, the lower enlarged portion is received within the immediately subjacent guide track and thus restrains upward movement of that transversely central portion of each overlying cover member relative to its subjacent cover member. The upper enlarged portion of each such guide member 112, 114 and 116 may engage the upper surface of its respective guide track and thus provide support for each overlying cover member relative to its subjacent cover member. By forming the guide members of a low friction synthetic resin, they provide for easy sliding between the guide tracks and the guide members. Each of these guide members 112, 114 and 116 may be affixed to their respective cover members by a suitable means such as rivets, pins or bolts 48.

As seen in the side section view of FIG. 6, each of the guide members 112, 114 and 116 are fixed to their respective cover members 24, 22 and 20 in positions that place them generally adjacent the rearward (left side in FIG. 6) end of the track members 104, 106 and 108 when the cover assembly is in its fully closed position as illustrated. By this positioning the enlarged portion of each guide member that is captured within its respective guide track is closely adjacent a respective stop 109, 111, 113 shown in FIGS. 6 and 7. Engagement between each such guide member and the respective stop will thus prevent each subjacent cover member from moving any further toward the front of the vehicle bed. This positioning thus secures the cover members against movement in the longitudinal, vertical or transverse direction, while the interlocking arrangement between the supporting slide assemblies and their guide tracks restrains transverse and vertical movement of the edges of the cover members. Because the guide track is disposed in a respective trough portion, adequate room is provided for the guide members and guide track to slide freely relative to one another without jamming. At the same time, a close fit is provided between adjacent cover members because the broad panels forming the cover members need not be spaced apart to accommodate the intermediate tracks and guides. As a result, dirt is prevented from entering between the cover members.

As shown most clearly in FIG. 6, the lowermost portion of the rear section 29 of second cover member 20 preferably has affixed thereto a flexible lip 110 formed of rubber or other resiliently flexible material, thus forming a sealing flap over the rear gate 10 of the vehicle to exclude dirt and rain, while permitting by its flexing the longitudinal movement of cover member 20 relative to the gate 10. A corresponding flexible lip 111 may be affixed to the lowermost portion of the front end 31 of first cover member 18.

When the releasable latching means on the rear panel is activated to withdraw the latching finger 30 from engagement with the hook 32 that second cover member 20 may then be moved forward. By virtue of the slight friction between the slide members 68 and their respective tracks 14, the cover members, while easily moved by hand, will remain in the position where they are placed by the user. Thus, the cover members 18, 22 and 24 may be set in any of a plurality of positions either fully covering or partially exposing the rear end of the vehicle bed.

As shown most clearly on FIGS. 6 and 7, second cover members 18–24 are each provided proximal the forward edge thereof with upwardly extending spoiler means 120 to deflect air passing over that cover member. Each spoiler extends transversely across its associated cover member and includes two sections, each of which extends substantially between the trough in the cover member and a respective side of the cover member. When the vehicle 2 is driven, the air passing over the vehicle passes over the vehicle cover. By the provision of these spoiler means 120 the passage of the air serves to urge the cover members downwardly, both reducing the effects of turbulent air that may cause the cover members to flutter and also urging adjacent cover members into closer engagement to exclude dirt from passing thereunder.

An alternative preferred telescoping truck bed cover assembly according to this invention is shown here in FIGS. 8 through 12. The elements which correspond to those parts previously described in connection with FIGS. 1 through 7 have been assigned similar numbers, increased by 200.

Figure 8:
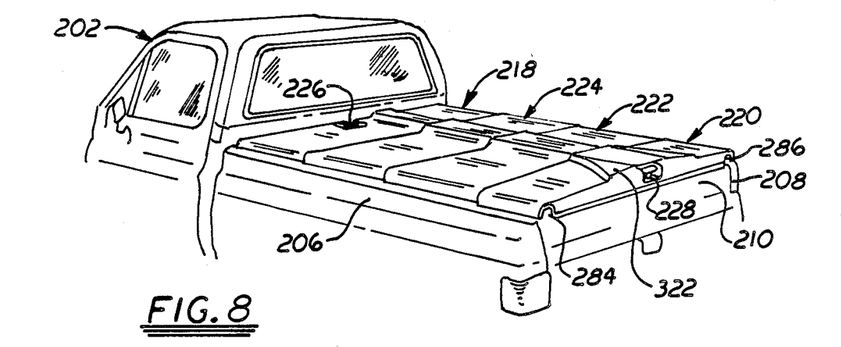
FIG. 8 is a perspective view of an alternative preferred embodiment of the vehicle bed cover assembly of this invention, installed on a pickup truck, with the cover members closed.
Figure 9:
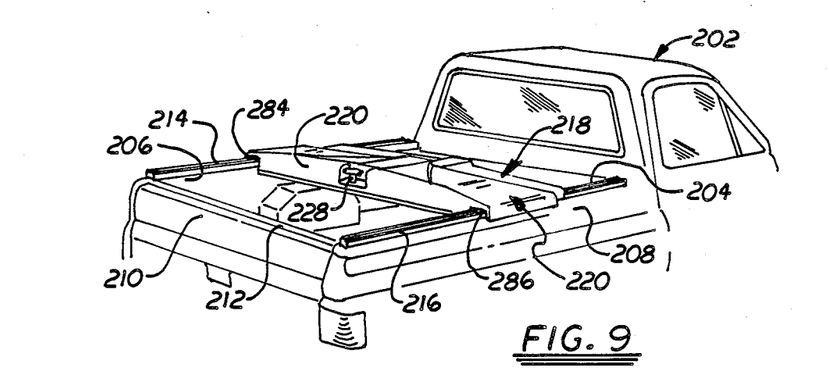
FIG. 9 is a perspective view of the cover assembly of FIG. 8 with the cover members in their telescopically collapsed, opened positions.

As shown in FIGS. 8 and 9 the cover assembly includes rigid cover members 218, 224, 222 and 220 arranged from front to rear, respectively, in a telescoping arrangement and slidably received along tracks 214 and 216. In particular, cover member 224 is received over cover member 218, cover member 222 is received over cover member 224, and cover member 220 is received over cover member 222.

Figure 10:
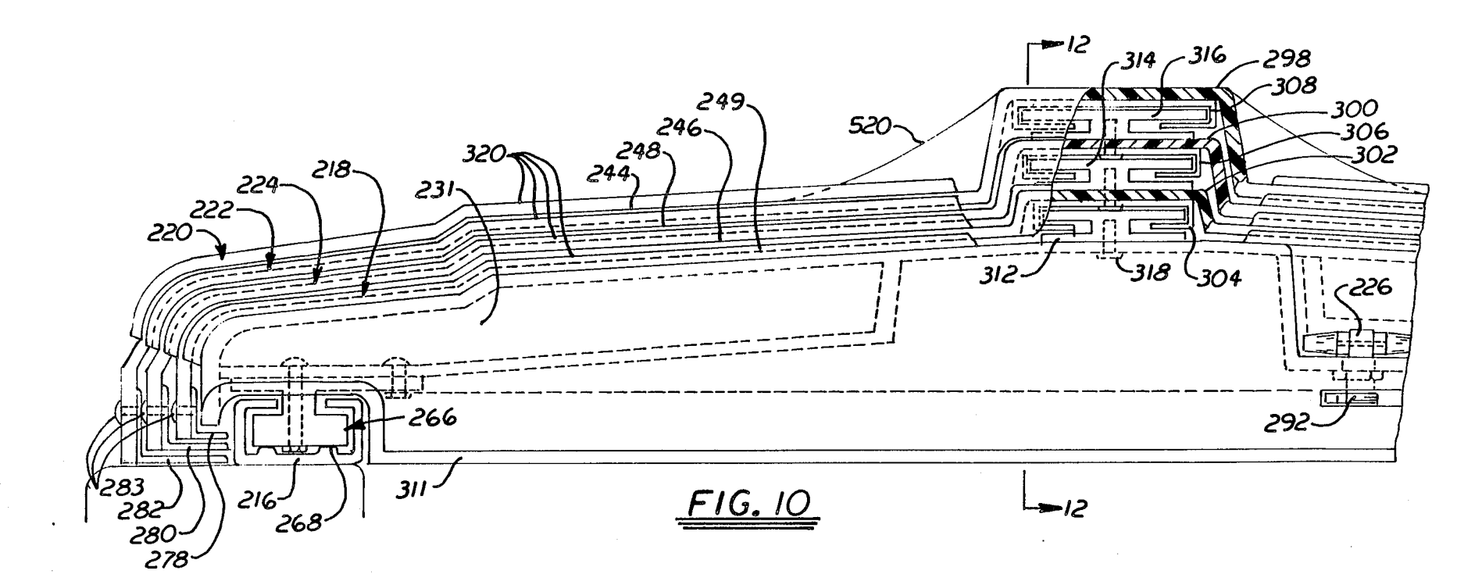
FIG. 10 is a fragmentary front elevational view of the cover assembly of FIG. 8.
Figure 11:
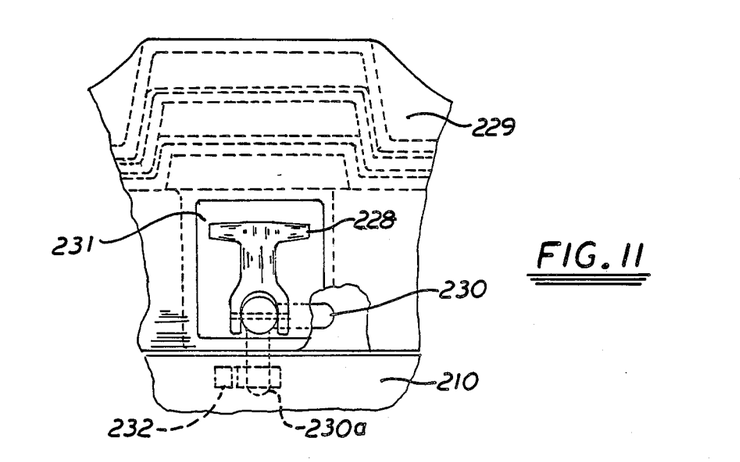
FIG. 11 is a fragmentary rear elevational view of the cover assembly of FIG. 8.
Figure 12:
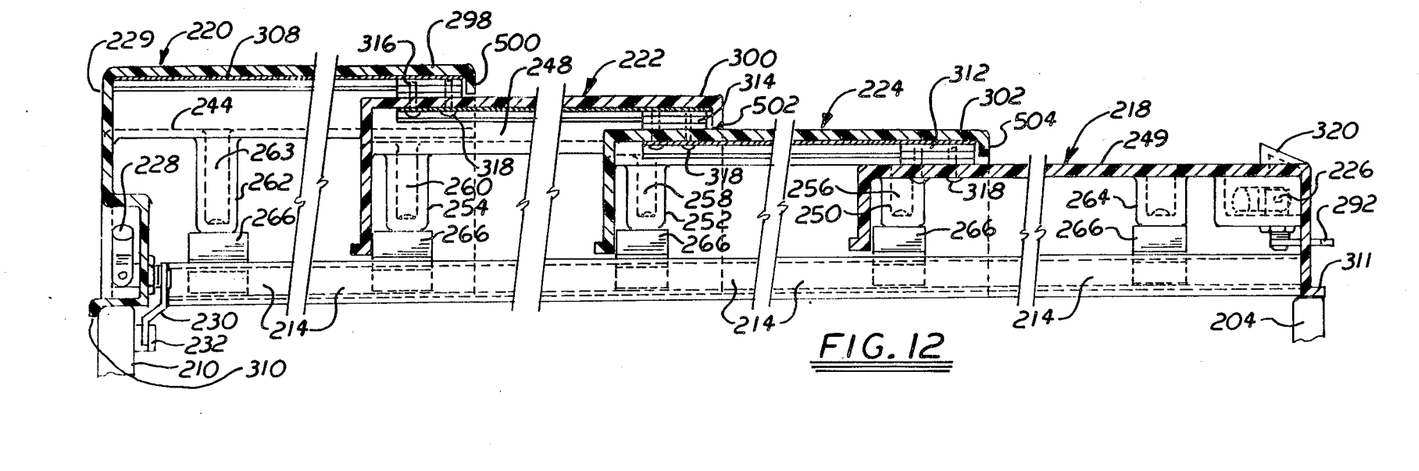
FIG. 12 is a side sectional view of the cover assembly of FIG. 10, taken along line 12—12.

As shown most clearly in FIGS. 10 through 12 means are provided for releasably latching both the forward cover member 218 and the rearward cover member 220 in a closed condition above the vehicle bed. The construction and operation of such releasably latching means are analogous to those described in the prior embodiment. Similarly, both the left and right sides of the cover assembly include slide assemblies 266 that fit within respective track members 214 and 216 as shown in FIGS. 10 and 12. The respective longitudinal sides also include an overlapping construction at the respective edges of each cover member. These elements are likewise constructed and operate analogously to elements described in the prior embodiment.

To provide for secure engagement between the adjacent cover members of this embodiment and to limit rearward movement of one adjacent cover member with respect to an adjacent such cover member alternative interengageable means are provided on the cover members. Such means are shown most clearly in FIGS. 10 and 12. In particular, cover members 220, 222, 224 and 218 are provided with hipped portions 244, 248, 246 and 249 respectively. Intermediate the opposing lateral sides of the cover members and preferably in the center of the hipped portions of cover members 220, 222, and 224 are formed upwardly extending ridges 298, 300 and 302, respectively, generally in the form of inverted troughs. Affixed to the inner downwardly facing surface of these ridges 298, 300 and 302 are intermediate guide tracks 308, 306 and 304, respectively. Each of these guide tracks 308, 306 and 304 preferably is in the form of a rectangular channel having a top and two full sides with partial bottom sides leaving open a slot along the bottom, somewhat similar to the configuration of guide tracks 214 and 216, but inverted. Affixed to cover members 218, 224 and 222 are intermediate guide members 312, 314 and 316, respectively. Each of these guide members has a configuration and composition similar to that described for the guide members 112, 114 and 116 in the prior embodiment. Each is attached to its respective cover member by suitable means such as a rivet or pin or bolt 318. As a particular cover member 220, 222 or 224 is closed, its guide track 308, 306, 304 slides relative to a respective guide member 316, 314, 312 on the subjacent cover member. Each ridge is closed at its forward end by a respective stop 500, 502 and 504 and when the stop encounters the guide member rearward movement of the overlying cover member is stopped. Preferably the stops 500, 502 and 504 are formed by downwardly extending portions of the respective cover member panels themselves. Accordingly, the construction and positioning of the guide members 312, 314 and 316 within track members 304, 306 and 308 secures the cover members against excessive movement in the longitudinal, vertical or transverse directions while the overlapping transverse edges and the locking arrangement between the supporting slide assemblies 266 and their guide tracks 214 and 216 restricts transverse and vertical movement of the edges of cover members.

As shown in FIGS. 10 and 12 spoiler means 320 are provided preferably in the form of transverse upwardly extending elements, across each of cover members 218, 220, 222 and 224. The spoilers attached to member 222 and 224 are obscured in FIG. 12 due to ridges 298 and 300. Each such spoiler 320 is provided proximate the forward edge of its respective cover member and preferably is formed in two sections, one on either side of the ridges. These transverse spoilers deflect air passing over the cover members and further assist in reinforcing the strength of the cover members. Cover member 220 includes a flared portion 322 that further serves to deflect air pressure over the cover assembly.

It may be noted that one advantage of the construction described above for this cover assembly is the suitability for using one set of cover members for a plurality of vehicle bed sizes. Likewise, vehicle beds of differing lengths may be accommodated by simply having greater or lesser overlap between adjacent cover members and accommodating the desired vehicle bed.

Another advantage of the construction described above is that it provides for easy removal of all of the cover members from the vehicle. By simply releasing the latching means securing the front cover member to the front of the vehicle bed and that securing the rearmost cover member to the vehicle bed, the telescoped cover members, as a unit, may easily be slid out the rear end of the track members and stored away from the vehicle, thus opening up the entire bed of the vehicle for use. Correspondingly, the cover members may then be remounted by simply inserting the support slide assembly of the telescoped cover members into the track members and extending the cover to latch the front and rear members in the desired locations.

While the foregoing has described particularly preferred embodiments of the vehicle bed cover assembly of this invention, it is to be understood that this description is illustrative only of the principles of this invention and is not to be considered limitative thereof. Because numerous variations and modifications of this apparatus, all within the scope of the invention, will readily occur to those skilled in the art, the scope of this invention is to be determined solely by the claims appended hereto.

What is claimed is:

1. A telescoping cover assembly for a vehicle bed, comprising a plurality of substantially rigid cover members, each having lateral sides extending transversely beyond the longitudinal edges of the lateral sides of said vehicle bed and each being longitudinally movable relative to another and each overlapping a longitudinally movable adjacent said cover member, with a first said cover member being releasably fixable in a position covering the front of said vehicle bed and being telescopically receivable under an adjacent said cover member, and a second cover member being releasably fixable in a position covering the rear end of said vehicle bed and being telescopically receivable over an adjacent said cover member, each adjacent pair of said cover members being configured such that one said adjacent cover member is telescopically receivable under the other said adjacent cover member, and each said adjacent pair of said cover members including interengagable means limiting rearward movement of said one adjacent cover member with respect to the other cover member to a predetermined amount, said interengagable means further comprising means for restraining upward movement of the transversely central portion of the overlying cover member of each said adjacent pair of cover members;

a pair of guide track members, one each affixed to said vehicle adjacent and longitudinally parallel to each lateral side of said vehicle bed for guiding said longitudinal movement of said cover members;

at least two support slide assemblies affixed to each said cover member, with one each of said support slide assemblies engaging each said guide track member to provide sliding support for said longitudinal movement of said cover member;

first releasable latching means affixed to said first cover member for releasably latching said first cover member in a position covering the front end of said vehicle body, whereby release of the first latching means permits the first cover member to be moved longitudinally of the vehicle bed along the track members to expose the front portion of the vehicle bed; and second releasable latching means affixed to said second cover member for releasably latching said second cover member in a position covering the rear of said vehicle bed, whereby release of the second latching means permits the second cover member to be moved longitudinally of the vehicle bed along the track members to expose the rear portion of the vehicle bed.

2. The cover assembly of claim 1 wherein each said support slide assembly includes means interlocking with its respective said guide track member to prevent lifting away from said track member of said cover member to which said slide assembly is attached.

3. The cover assembly of claim 1 wherein each said cover member includes upwardly facing spoiler means that extends transversely across said cover member for urging said cover member downwardly under the influence of air passing thereover when said vehicle is driven.

4. The cover assembly of claim 3 wherein said cover member comprises a forward portion that includes said spoiler means.

5. The cover assembly of claim 1 wherein said interengageable means further comprises means for supporting said transversely central portion of said overlying cover member for longitudinal sliding movement relative to said adjacent underlying cover member.

6. The cover assembly of claim 1 wherein
each said cover member includes means adjacent the transverse extremities thereof for restricting vertical movement of said cover members.

7. The cover assembly of claim 6 wherein said vertical movement restricting means comprise lip means on said transverse extremity of each said one cover member extending under said transverse extremity of each said other adjacent cover member, whereby the extension of each such lip means under the extremity of the adjacent underlying cover member prevents vertical removal of the overlying cover member from the adjacent underlying said cover member.

8. The cover assembly of claim 1 wherein at least one said cover member includes a drainage channel extending generally transverse to said vehicle bed to carry water entering said channel to at least one longitudinal edge of said cover member, whereby rain or other water entering the channel from the cover member may be carried to the outer edge of the cover assembly for removal.

9. The cover assembly of claim 1 wherein
said vehicle bed comprises a pickup truck bed having a front side and two longitudinally extending lateral sides and a rear gate extending between said lateral sides and having an upper edge and, spaced therefrom, a lower edge, said gate being hingedly attached to said vehicle adjacent said gate lower edge, and
said second cover member extends above said bed lateral sides and said rear gate and includes a fixed, generally rearmost portion extending downwardly proximal and generally parallel to said gate upper edge when said second cover member is positioned covering the rear end of said vehicle bed.

10. The cover assembly of claim 9 wherein said second cover member further comprises flexible lip means extending downwardly from said second cover member generally rearmost portion to overlie at least a portion of said gate upper edge when said second cover member is positioned covering said vehicle bed rear end.

11. The cover assembly of claim 1 wherein
said vehicle bed comprises a pickup truck bed having a front side and two longitudinally extending lateral sides and a rear gate extending between said lateral sides, with said front side having an upper edge, and
said first cover member extends above said bed lateral sides and said front side and includes a fixed, generally forwardmost portion extending downwardly proximal and generally parallel to said front side upper edge when said front cover member is positioned covering the front end of said vehicle bed, and
said first cover member further comprises flexible lip means extending downwardly from said cover member generally forwardmost portion to overlie at least a portion of said bed front side upper edge when said first cover member is positioned covering said vehicle bed front end.

12. The cover assembly of claim 1 wherein at least one cover member of each adjacent pair of cover members comprises a trough portion that extends substantially from the front of said one cover member to a location proximate the rear thereof and intermediate the opposing lateral sides thereof, each adjacent pair of cover members further comprising interengageable means limiting relative movement of said adjacent cover members to a predetermined amount and including an intermediate guide track and intermediate guide means slidably engageable with said intermediate guide track, one of said intermediate guide track and said intermediate guide means being attached to said one adjacent cover member within said trough portion and the other of said intermediate guide track and said intermediate guide means being attached to the other said adjacent cover member.

13. The assembly of claim 12 wherein said first intermediate guide track is attached to said one adjacent cover member within said trough portion and said intermediate guide means are attached to said other cover member.

14. The assembly of claim 12 wherein said guide means comprises an intermediate support slide received within said intermediate guide track such that said intermediate guide track supports said intermediate slide means and such that movement of said intermediate slide means longitudinally of said intermediate guide track will urge foreign material along said intermediate guide track before said intermediate slide means.

15. The assembly of claim 12 wherein said interengageable means further include stop means on said one adjacent cover member, said stop means being engageable with said guide means to limit rearward movement of said one adjacent cover member relative to said other cover member to a predetermined amount.

16. The assembly of claim 1 wherein said guide track member includes an upwardly facing bottom surface having rib means extending upwardly therefrom and longitudinally of said guide track member such that said engagement of said guide track member by said slide assembly comprises engagement of a lower portion of said slide assembly with an upper portion of said rib means.

17. The cover assembly of claim 1 wherein at least one cover member of each adjacent pair of cover members comprises a ridge portion generally in the form of an inverted trough that extends from a location proximate the rear of said one cover member to a location proximate the front thereof and intermediate the opposing lateral sides thereof, each adjacent pair of cover members further comprising interengageable means limiting relative movement of said adjacent cover members to a predetermined amount and including an intermediate guide track and intermediate guide means slidably engageable with said intermediate guide track, one of said intermediate guide track and said intermediate guide means being attached to said one adjacent cover member within said inverted trough and the other of said intermediate guide track and said intermediate guide means being attached to the other said adjacent cover member.

18. The assembly of claim 17 wherein said first intermediate guide track is attached to said one adjacent cover member within said inverted trough and said intermediate guide means are attached to said other cover member.

19. The assembly of claim 17 wherein said interengageable means further include stop means on said one adjacent cover member, said stop means being engageable with said guide means to limit rearward movement of said one adjacent cover member relative to said other cover member to a predetermined amount.

20. The assembly of claim 1 wherein each said cover member includes a transverse strengthening rib that extends generally between the lateral sides of said cover member.

21. The assembly of claim 20 wherein said cover member includes a forward end and a rearward end and said strengthening rib depends from said rearward end of said cover member.

22. A telescoping cover assembly for a vehicle bed, comprising
- a plurality of substantially rigid cover members, each having lateral sides extending transversely beyond the longitudinal edges of the lateral sides of said vehicle bed and each being longitudinally movable relative to another and each overlapping a longitudinally adjacent said cover member, with a first said cover member being releasably fixable in a position covering the front end of said vehicle bed and being telescopically receivable under an adjacent said cover member, and a second cover member being releasably fixable in a position covering the rear end of said vehicle bed and being telescopically receivable over an adjacent said cover member, each said cover member including upwardly facing spoiler means that extend transversely across said cover member for urging said cover member downwardly under the influence of air passing thereover when said vehicle is driven; and
- a pair of guide track members, one each affixed to said vehicle adjacent and longitudinally parallel to each lateral side of said vehicle bed for guiding said longitudinal movement of said cover members;
- at least two support slide assemblies affixed to each said cover member, with one each of said support slide assemblies engaging each said guide track member to provide sliding support for said longitudinal movement of said cover member;
- first releasable latching means affixed to said first cover member for releasably latching said first cover member in a position covering the front end of said vehicle, whereby release of the first latching means permits the first cover member to be moved longitudinally of the vehicle bed along the track members to expose the front portion of the vehicle bed; and
- second releasable latching means affixed to said second cover member for releasably latching said second cover member in a position covering the rear of said vehicle bed, whereby release of the second latching means permits the second cover member to be moved longitudinally of the vehicle bed along the track members to expose the rear portion of the vehicle bed.

23. A telescoping cover assembly for a vehicle bed, comprising
- a plurality of substantially rigid cover members, each having lateral sides extending transversely beyond the longitudinal edges of the lateral sides of said vehicle bed and each being longitudinally movable relative to another and each overlapping a longitudinally adjacent said cover member, with a first said cover member being releasably fixable in a position covering the front of said vehicle bed and being telescopically receivable under an adjacent said cover member, and a second cover member being releasably fixable in a position covering the rear end of said vehicle bed and being telescopically receivable over an adjacent said cover member;
- a pair of guide track members, one each affixed to said vehicle adjacent and longitudinally parallel to each lateral side of said vehicle bed for guiding said longitudinal movement of said cover members;
- at least two support slide assemblies affixed to each said cover member, with one each of said support slide assemblies engaging each said guide track member to provide sliding support for said longitudinal movement of said cover member;
- at least one cover member of each adjacent pair of cover members comprising a trough portion that extends substantially from the front of said one cover member to a location proximate the rear thereof and intermediate the opposing lateral sides thereof, each adjacent pair of cover members further comprising interengageable means limiting relative movement of said adjacent cover members to a predetermined amount and including an intermediate guide track and intermediate guide means slidably engagable with said intermediate guide track, one of said intermediate guide track and said intermediate guide means being attached to said one adjacent cover member within said trough portion and the other of said intermediate guide track and said intermediate guide means being attached to the other said adjacent cover member;
- first releasable latching means affixed to said first cover member for releasably latching said first cover member in a position covering the front end of said vehicle, whereby release of the first latching means permits the first cover member to be moved longitudinally of the vehicle bed along the track members to expose the front portion of the vehicle bed; and
- second releasable latching means affixed to said second cover member for releasably latching said second cover member in a position covering the rear of said vehicle bed, whereby release of the second latching means permits the second cover member to be moved longitudinally of the vehicle bed along the track members to expose the rear portion of the vehicle bed.

24. A telescoping cover assembly for a vehicle bed, comprising
- a plurality of substantially rigid cover members, each having lateral sides extending transversely beyond the longitudinal edges of the lateral sides of said vehicle bed and each being longitudinally movable relative to another and each overlapping a longitudinally adjacent said cover member, with a first said cover member being releasably fixable in a position covering the front of said vehicle bed and being telescopically receivable under an adjacent said cover member, and a second cover member being releasably fixable in a position covering the rear end of said vehicle bed and being telescopically receivable over an adjacent said cover member;
- a pair of guide track members, one each affixed to said vehicle adjacent and longitudinally parallel to each lateral side of said vehicle bed for guiding said longitudinal movement of said cover members;

at least two support slide assemblies affixed to each said cover member, with one each of said support slide assemblies engaging each said guide track member to provide sliding support for said longitudinal movement of said cover member;

at least one cover member of each adjacent pair of cover members comprising a ridge portion generally in the form of an inverted trough that extends from a location proximate the rear of said one cover member to a location proximate the front thereof and intermediate the opposing lateral sides thereof, each adjacent pair of cover members further comprising interengagable means limiting relative movement of said adjacent cover members to a predetermined amount and including an intermediate guide track and intermediate guide means slidably engagable with said intermediate guide track, one of said intermediate guide track and said intermediate guide means being attached to said one adjacent cover member within said inverted trough and the other of said intermediate guide track and said intermediate guide means being attached to the other said adjacent cover member;

first releasable latching means affixed to said first cover member for releasably latching said first cover member in a position covering the front end of said vehicle, whereby release of the first latching means permits the first cover member to be moved longitudinally of the vehicle bed along the track members to expose the front portion of the vehicle bed; and second releasable latching means affixed to said second cover member for releasably latching said second cover member in a position covering the rear of said vehicle bed, whereby release of the second latching means permits the second cover member to be moved longitudinally of the vehicle bed along the track members to expose the rear portion of the vehicle bed.

* * * * *